(12) United States Patent
Wang

(10) Patent No.: US 9,147,096 B2
(45) Date of Patent: Sep. 29, 2015

(54) IMAGING APPARATUS HAVING LENS ELEMENT

(71) Applicant: Hand Held Products, Inc., Fort Mill, SC (US)

(72) Inventor: Ynjiun Paul Wang, Cupertino, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 243 days.

(21) Appl. No.: 13/751,219

(22) Filed: Jan. 28, 2013

(65) Prior Publication Data

US 2014/0131444 A1    May 15, 2014

Related U.S. Application Data

(60) Provisional application No. 61/725,820, filed on Nov. 13, 2012.

(51) Int. Cl.
*G06K 7/10* (2006.01)

(52) U.S. Cl.
CPC .. *G06K 7/10831* (2013.01); *G06K 2007/10485* (2013.01)

(58) Field of Classification Search
USPC .................................................. 235/454, 470
See application file for complete search history.

(56) References Cited

U.S. PATENT DOCUMENTS

| 5,955,721 | A | 9/1999 | Dickson et al. |
|---|---|---|---|
| 5,975,419 | A | 11/1999 | Dickson et al. |
| 5,984,185 | A | 11/1999 | Dickson et al. |
| 6,003,772 | A | 12/1999 | Dickson et al. |
| 6,006,993 | A | 12/1999 | Dickson et al. |
| 6,024,282 | A | 2/2000 | Dickson et al. |
| 6,024,283 | A | 2/2000 | Campanelli et al. |
| 6,062,476 | A | 5/2000 | Stern et al. |
| 6,062,479 | A | 5/2000 | Dickson et al. |
| 6,073,846 | A | 6/2000 | Dickson et al. |
| 6,085,978 | A | 7/2000 | Knowles et al. |
| 6,085,980 | A | 7/2000 | Dickson et al. |
| 6,158,659 | A | 12/2000 | Dickson et al. |
| 6,199,759 | B1 | 3/2001 | Dickson et al. |
| 6,290,132 | B1 | 9/2001 | Dickson et al. |
| 6,328,215 | B1 | 12/2001 | Dickson et al. |
| 6,347,742 | B2 | 2/2002 | Winarski et al. |
| 6,375,074 | B1 | 4/2002 | Dickson et al. |
| 6,422,466 | B1 | 7/2002 | Dickson et al. |
| 6,439,462 | B1 | 8/2002 | Dickson et al. |

(Continued)

OTHER PUBLICATIONS

Programmable Autofocus Driver IC Enables World's First Solid State AF Digital Camera, SMB274 Fact Sheet printed from www.summitmicro.com/prod_select/summary/SMB274/SMB274.htm, dated Oct. 17, 2012, 1 page.

(Continued)

*Primary Examiner* — Allyson Trail
(74) *Attorney, Agent, or Firm* — Additon, Higgins & Pendleton, P.A.

(57) ABSTRACT

There is provided in one embodiment an imaging apparatus having a lens assembly. The lens assembly can comprises a lens element having a first light transmissive substrate and a second light transmissive substrate, the first light transmissive substrate including a first electrode, the second light transmissive substrate including a second electrode. The lens element can further comprise liquid crystal material intermediate the first light transmissive substrate and the second light transmissive substrate.

17 Claims, 8 Drawing Sheets

(56) References Cited

U.S. PATENT DOCUMENTS

| | | |
|---|---|---|
| 6,457,646 B1 | 10/2002 | Dickson et al. |
| 6,474,556 B2 | 11/2002 | Dickson et al. |
| 6,530,522 B1 | 3/2003 | Check et al. |
| 6,543,693 B1 | 4/2003 | Stern et al. |
| 6,547,144 B1 | 4/2003 | Dickson et al. |
| 6,561,424 B1 | 5/2003 | Dickson et al. |
| 6,619,550 B1 | 9/2003 | Good et al. |
| 6,840,449 B2 | 1/2005 | Check et al. |
| 6,953,153 B2 | 10/2005 | Dickson et al. |
| 7,121,467 B2 | 10/2006 | Winter et al. |
| 7,152,796 B2 | 12/2006 | Dickson et al. |
| 7,201,318 B2 | 4/2007 | Craen et al. |
| 7,264,162 B2 | 9/2007 | Barkan |
| 7,296,749 B2 | 11/2007 | Massieu |
| 7,813,047 B2 | 10/2010 | Wang et al. |
| 7,905,407 B2 | 3/2011 | Wittenberg et al. |
| 7,918,398 B2 | 4/2011 | Li et al. |
| 7,946,493 B2 | 5/2011 | Havens et al. |
| 8,027,095 B2 | 9/2011 | Havens |
| 8,027,096 B2 | 9/2011 | Feng et al. |
| 8,038,066 B2 | 10/2011 | Havens et al. |
| 8,083,148 B2 | 12/2011 | Wang et al. |
| 8,226,009 B2 | 7/2012 | Havens et al. |
| 8,256,678 B2 | 9/2012 | Havens et al. |
| 8,261,992 B2 | 9/2012 | Havens et al. |
| 8,282,004 B2 | 10/2012 | Wang et al. |
| 8,292,183 B2 | 10/2012 | Li et al. |
| 8,305,691 B2 | 11/2012 | Havens et al. |
| 2005/0199720 A1 | 9/2005 | Barkan |
| 2005/0199725 A1 | 9/2005 | Craen et al. |
| 2005/0218231 A1 | 10/2005 | Massieu |
| 2005/0258252 A1 | 11/2005 | Winter et al. |
| 2007/0063048 A1 | 3/2007 | Havens et al. |
| 2007/0080280 A1 | 4/2007 | Havens |
| 2007/0156021 A1 | 7/2007 | Morse et al. |
| 2008/0144185 A1 | 6/2008 | Wang et al. |
| 2008/0144186 A1 | 6/2008 | Feng et al. |
| 2009/0072038 A1 | 3/2009 | Li et al. |
| 2009/0088203 A1 | 4/2009 | Havens et al. |
| 2009/0302116 A1 | 12/2009 | Tan et al. |
| 2010/0123007 A1 | 5/2010 | Wittenberg et al. |
| 2010/0147956 A1 | 6/2010 | Wang et al. |
| 2010/0276490 A1 | 11/2010 | Havens et al. |
| 2010/0276491 A1 | 11/2010 | Havens et al. |
| 2010/0276492 A1 | 11/2010 | Wang et al. |
| 2010/0276493 A1 | 11/2010 | Havens et al. |
| 2011/0017829 A1 | 1/2011 | Wang et al. |
| 2011/0036908 A1 | 2/2011 | Havens et al. |
| 2011/0036911 A1* | 2/2011 | Havens et al. ............... 235/470 |
| 2011/0174880 A1 | 7/2011 | Li et al. |
| 2011/0212751 A1 | 9/2011 | Havens et al. |
| 2012/0193418 A1 | 8/2012 | Wang et al. |
| 2012/0196648 A1 | 8/2012 | Havens et al. |
| 2012/0196649 A1 | 8/2012 | Havens et al. |
| 2012/0248195 A1 | 10/2012 | Feng et al. |
| 2012/0261474 A1* | 10/2012 | Kawashime et al. .... 235/462.24 |

OTHER PUBLICATIONS

Lens Vector Overview, Mar. 2011, (while pages of this Citation are marked Confidential, the overview was downloaded from a publicly accessible website on Oct. 17, 2012, http://www.lensvector.com) 27 pages.

Product Summary for SMB274: Programmable Driver for Lens Vector AutoFocus (LVAF) Devices, printed from http://www.summitmicro.com/pod_select/summary/SMB274/SMB274.htm, on Oct. 17, 2012, 2 pages.

Lens Vector Press Release dated Feb. 15, 2010, Summit Programmable Driver Powers Lens Vector Solid-State Autofocus Device for Mobile Phone Cameras, printed from http://www.lensvector.com/pressrel20100215.html, 1 page.

O.Pishnyak, S. Sato, and O. Lavrentovich, "Electrically Tunable Lens Based on a Dual-Frequency Nematic Liquid Crystal", Appl. Opt. vol. 45, No. 19, 4576-4582, Jul. 1, 2006.

* cited by examiner

IMAGING APPARATUS HAVING LENS ELEMENT

CROSS REFERENCE TO RELATED APPLICATIONS

This application claims priority to U.S. Provisional Application No. 61/725,820 filed Nov. 13, 2012 entitled, "Imaging Apparatus Having Lens Element." The above application is incorporated herein by reference in its entirety.

FIELD OF THE INVENTION

The present invention relates in general to optical systems and specifically to optical systems having optical characteristics that can be varied.

BACKGROUND OF THE INVENTION

Image sensor integrated circuits having multiple pixel image sensor arrays are commercially available. Imaging apparatus having image sensor arrays are available in a variety of forms, including digital cameras, mobile phones, surveillance equipment, medical diagnostic equipment, and indicia decoding apparatus. Imaging apparatuses are available in forms with indicia decoding capability and without decoding capability. Imaging apparatus with indicia decoding capability can be regarded as indicia reading apparatus.

Indicia reading apparatus for reading decodable indicia are available in multiple varieties. For example, minimally featured indicia reading apparatus devoid of a keyboard and display are common in point of sale applications. Indicia reading apparatus devoid of a keyboard and display are available in the recognizable gun style form factor having a handle and trigger button (trigger) that can be actuated by an index finger. Indicia reading apparatus having keyboards and displays are also available, often in a form where a keyboard and display is commonly located by the providing of a touch screen type display. Keyboard and display equipped indicia reading apparatus are commonly used in retail, shipping and warehouse applications. In a keyboard and display equipped indicia reading apparatus, a trigger button for actuating the output of decoded messages is typically provided in such locations as to enable actuation by a thumb of an operator. Indicia reading apparatus in a form devoid of a keyboard and display or in a keyboard and display equipped form are commonly used in a variety of data collection applications including retail point of sale applications, retail inventory applications, shipping applications, warehousing applications, security check point applications, patient care applications, and personal use, common where keyboard and display equipped indicia reading apparatus is provided by a personal mobile telephone having indicia reading functionality. Fixed mount indicia reading apparatus are also commonly available, e.g., installed under or near a countertop at a point of sale. Some indicia reading apparatus are adapted to read bar code symbols including one or more of one dimensional (1D) bar codes, stacked 1D bar codes, and two dimensional (2D) bar codes. Other indicia reading apparatus are adapted to read OCR characters while still other indicia reading apparatus are equipped to read both bar code symbols and OCR characters.

SUMMARY OF THE INVENTION

There is provided in one embodiment an imaging apparatus having a lens assembly. The lens assembly can comprise a lens element having a first light transmissive substrate and a second light transmissive substrate, the first light transmissive substrate including a first electrode, the second light transmissive substrate including a second electrode. The lens element can further comprise liquid crystal material intermediate the first light transmissive substrate and the second light transmissive substrate.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 2:
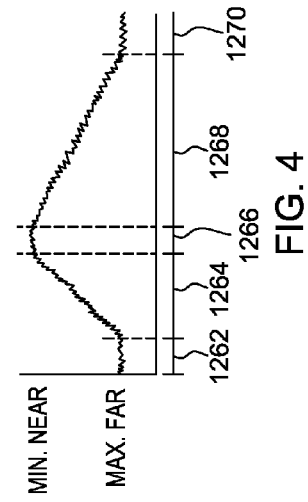
FIG. 2 is a timing diagram illustrating expected operation of an exemplary nematic liquid crystal lens element.

In one embodiment there is set forth an imaging apparatus comprising an imaging assembly including an image sensor array having a plurality of pixels. The imaging apparatus can comprise a memory for storing (e.g., buffering) image data, wherein the apparatus is adapted for processing the image data for attempting to decode decodable indicia represented in the image data. An imaging apparatus can comprise a variable lens assembly for focusing an image of a target onto the image sensor array.

In one aspect an imaging apparatus can be operative to change a lens setting of the lens assembly between at least two different lens settings, e.g., a first lens setting and a second lens setting. At each of the first and second lens settings the lens assembly can define a certain plane of optimum focus distance, as measured from the imaging apparatus. The imaging apparatus can further be operative to expose during a first exposure period a first frame of image data with the lens assembly defining a plane of optimum focus distance "a" from the apparatus. The imaging apparatus can further be operative to expose during a second exposure period a second frame of image data with the lens assembly defining a plane of optimum focus distance "b" from the apparatus. The "a" distance can be a steady state distance corresponding to a lens setting of the lens assembly. The "a" distance can alternatively be a changing (dynamically variable) distance that is intermediate of first and second plane of optimum focus distances corresponding to first and second lens settings of the lens assembly. The "b" distance can be a steady state distance corresponding to a lens setting of the lens assembly. The "b"

distance can alternatively be a changing (dynamically variable) distance that is intermediate of first and second plane of optimum focus distances corresponding to first and second lens settings of the lens assembly.

The apparatus can further be configured so that the apparatus is operative to subject each of the first and second frames of image data to a decode attempt for decoding of a decodable indicia. In one aspect the lens assembly can comprise a lens element having a first light transmissive substrate and a second light transmissive substrate, the first light transmissive substrate including a first electrode, the second light transmissive substrate including a second electrode. The lens element can further comprise liquid crystal material disposed intermediate the first substrate and the second substrate.

In one particular embodiment, the liquid crystal material can have a positive sign of dielectric anisotropy for a first set of frequencies of applied electric field smaller than a crossover frequency and a negative sign of dielectric anisotropy for a second set of frequencies of applied electric field larger than a crossover frequency.

In one aspect the apparatus can be operative to drive the lens element at a first frequency within the first set (range) of frequencies and can be further operative to drive the lens element at a second frequency within the second set of frequencies. The second set of frequencies can be non-overlapping with the first set of frequencies. Each of the first and second frequencies can be fixed, steady state frequencies or dynamic (changing) frequencies. In one embodiment, driving the lens element at the first frequency results in a change in a diopter (and focal length) exhibited by the lens element in a first direction (e.g., smaller to larger optical power) and driving the lens element of at the second frequency results in a change in a diopter (and focal length) exhibited by the lens element in a second direction opposite the first direction (e.g., larger to smaller optical power).

Figure 1:
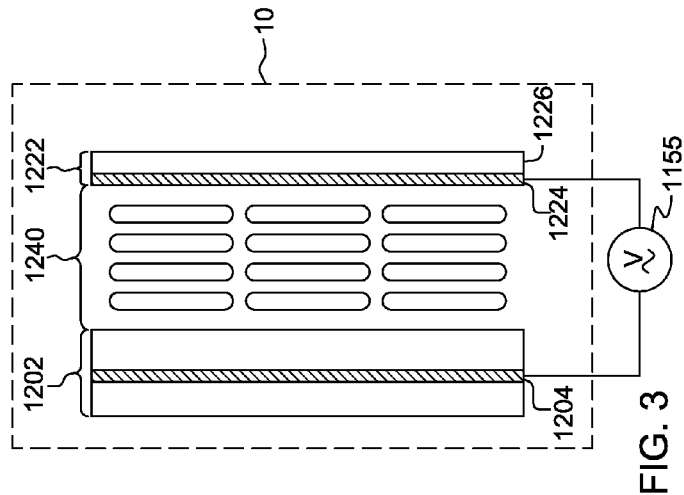
FIG. 1 is a perspective view of a lens element including liquid crystal material.

In FIG. 1 there is depicted a lens element 10. In one embodiment, lens element 10 can be provided by a liquid crystal lens element. In one embodiment the liquid crystal lens element can be a nematic liquid crystal (NLC) lens element. Lens element 10 in one embodiment can comprise a first substrate 1102 and a second substrate 1122. First substrate 1102 in one embodiment can be a 1.1 mm thick substrate with a continuous transparent indium tin oxide (ITO) electrode 1104 disposed on an SiOx layer 1106. Second substrate 1122 can be a 0.2 mm thick substrate with a hole-patterned aluminum electrode 1124 disposed on an SiOx layer 1126.

In one embodiment, the ratio of the lens element diameter D to the lens element thickness d can be between 2 and 3. In one embodiment, a lens aperture, i.e., the diameter of the hole, is D=300 μm while d=110 μm.

The cell layer 1140 (the area between substrate 1102 and substrate 1122) can be filled with the dual-frequency NLC material MLC-2048 (Merck), which has the positive sign of dielectric anisotropy $\Delta\epsilon = \epsilon_{parallel} - \epsilon_{perpendicular} > 0$ for frequencies f of the applied electric field smaller than the crossover frequency $f_c=12$ kHz (at 20° C.) and negative $\Delta\epsilon < 0$ when $f > f_c$. In one example, $\epsilon_{parallel} - \epsilon_{perpendicular}$ can be the dielectric permittivities of the NLC in the directions parallel and perpendicular to the LC director, respectively.

Figure 3:
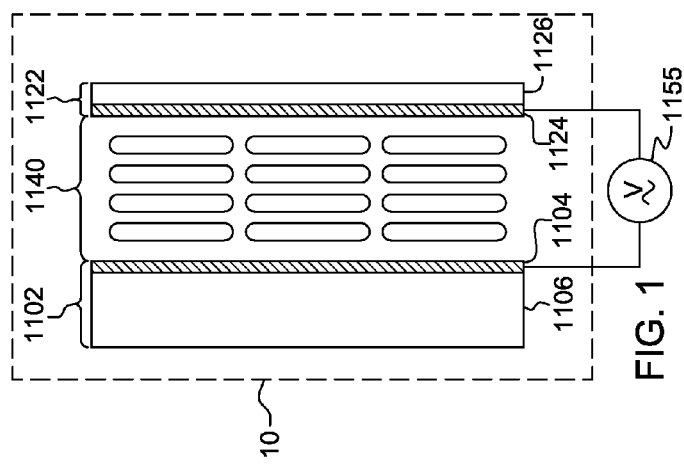
FIG. 3 is a diagram of a liquid crystal lens element in an alternative embodiment.

In one example, when $\Delta\epsilon > 0$, the director reorients toward the electric field; when $\Delta\epsilon < 0$, it reorients perpendicularly to the field. Two characteristic driving frequencies are f=1 kHz ($f_1$), at which $\Delta\epsilon = 3.2$, and f=50 kHz ($f_2$), at which $\Delta\epsilon = -3.1$ (both values of the dielectric anisotropy correspond to the temperature 20° C.). The optical birefringence of the material $\Delta n=0.22$ at $\lambda=589$ nm. The initial orientation of the director can be established at approximately 45° with respect to the bounding plates by treating the substrates 1102 and 1122 with an obliquely deposited layer of $SiO_x$. Though a high-pretilt alignment of the LC director leads to a phase loss in comparison with the planar (low-pretilt) geometry, a high-pretilt angle can facilitate the realizing both positive and negative lenses in the same cell through the change of the frequency of the applied field. In addition, the 45° pretilt maximizes the reorienting torque of the electric field. The hole-patterned electrode 1124 can provide a nonlinear distribution of the electric field inside the LC layer 1140, which causes a non-uniform reorientatation of the LC director and thus the lens effect. Further aspects of exemplary lens element 10 as set forth in FIG. 1 are described in O. Pishnyak, S. Sato, and O. Lavrentovich, "Electrically tunable lens based on a dual-frequency nematic liquid crystal," Appl. Opt. 45, 4576-4582 (2006). FIG. 2 illustrates driving characteristics of the lens element of FIG. 1. For maintaining a maximally far focus lens setting during transitioning period 1162 a holding voltage of 4 VRMS at 50 KHz ($f_2$), can be applied. For transitioning to a minimally near focus lens setting during transitioning period 1164, a voltage of 50 VRMS at 1 KHz ($f_1$) can be applied, and a transition time can be about 50 ms. For maintaining the minimally near focus lens setting during period 1166 a holding voltage of 4 VRMS at 1 KHz ($f_1$) can be applied across electrodes 1104 and 1106. For transitioning back to an maximally far focus lens setting during transitioning period 1168 a voltage of 40 VRMS at 50 KHz ($f_2$) can be applied. The transition time can be about 75 ms (within 30 ms of the transition time from a maximally far focus and minimally near focus lens setting). For maintaining the maximally far focus lens setting during period 1170 a holding voltage of 4 VRMS at 50 KHz ($f_2$) can be applied. In the described embodiments, the transition times (maximally far focus to minimally near focus, minimally near focus to maximally far focus) are within 40% to 160% relative to one another in terms of duration. In another embodiment, the transition times are within 50% to 150% of one another, and are within 30 ms of one another in terms of elapsed time. In another embodiment the transition times are within 80% to 120% from one another in terms of elapsed time. The configuration of lens elements 1000 set forth in FIG. 1 facilitate use of an applied sinusoidal drive voltage for driving lens element 10 from a maximally far focus to a minimally near focus lens setting as well as from a minimally near focus to a maximally far focus lens setting, bringing the times for these two opposite direction lens setting changes closer in proximity to one another in terms of duration. In one embodiment, lens element 10, as depicted in the examples of FIGS. 1 and 3, can be driven by a voltage source 1155. A first voltage terminal of voltage source 1155 can be connected to electrode layer 1104 and a second voltage terminal of voltage source 1155 can be connected to electrode layer 1124.

In one example, lens element 10 is provided by a LensVector AutoFocus (LVAF) Liquid Crystal Lens (LC) lens of the type available from LensVector Inc. of Sunnyvale, Calif.

Figure 4:
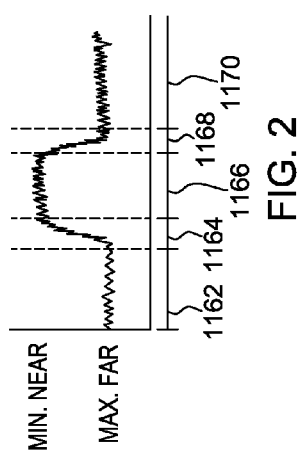
FIG. 4 is a timing diagram illustrating expected operation of an exemplary liquid crystal lens element.

In FIG. 3 there is depicted a Lens Vector LVAF liquid crystal lens element. Lens element 10 in one embodiment can comprise a first substrate 1202 and a second substrate 1222. First substrate 1202 in one embodiment can be a substrate with a continuous electrode 1104 disposed on an SiOx layer 1206. Second substrate 1222 can be a substrate with an electrode 1224 disposed on an SiOx layer 1226. Lens element 10 can be operated in a manner depicted in FIG. 4. During period 1262 (unfocused state) there can be applied no voltage (Voltage in a removed state) to the electrodes 1204 and 1224 of lens element 10. During transitioning period 1264 wherein lens element 10 transitions from maximally far focus lens setting to a minimally near focus lens setting there can be applied a specified driving voltage at a specified fixed frequency. The transition time during period 1264 can be about 350 ms. The driving voltage and frequency of period 1266 (steady state minimally near focus) can be maintained in period 1264. During transitioning period 1268 no voltage can be applied to the electrodes 1204, 1224 of lens element 10 (applied voltage in a removed state). Applied voltage can also be in a removed state during period 1270. Lens element 10 can thusly return to an unfocused state. The transition time of period 1268 can be about 700 ms.

Lens element 10 can be employed alone or in combination with other optical elements to define a lens assembly 200. Lens element 10 can be regarded as a focusing apparatus. A focusing apparatus can comprise one or more lens element. It will be understood, with reference to FIGS. 1 through 4, and with reference to FIGS. 5 and 6, herein that a change in a lens setting of lens element 10 can define a change in a lens setting of variable lens assembly 200.

Figure 6:
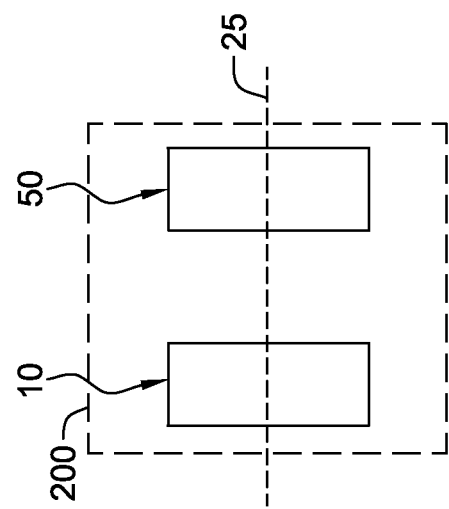
FIG. 6 is a schematic design of a lens assembly.
Figure 5:
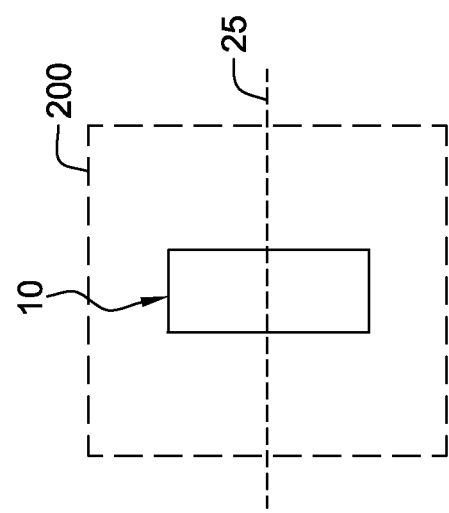
FIG. 5 is a schematic diagram of a lens assembly.

Variations of lens assembly 200 comprising focusing apparatus 10 are shown in FIGS. 5 and 6. In the embodiment of FIG. 5 lens assembly 200 comprises lens element 10. In the embodiment of FIG. 6, lens assembly 200 comprises lens element 10 and additional optical element 50. Additional optical element 50 can comprise, e.g., a focusing apparatus comprising liquid crystal lens element, a focusing apparatus including a deformable fluid lens element, a focusing apparatus including an electrowetting fluid lens element, or a traditional non-deformable solid (e.g., glass, polycarbonate) lens element. In another embodiment, lens assembly 200 can comprise a plurality of additional optical elements. The noted LVAF leans element is available in a lens assembly package (an LVAF lens-kit) having a liquid crystal lens element 10 and additional lens elements.

Figure 7:
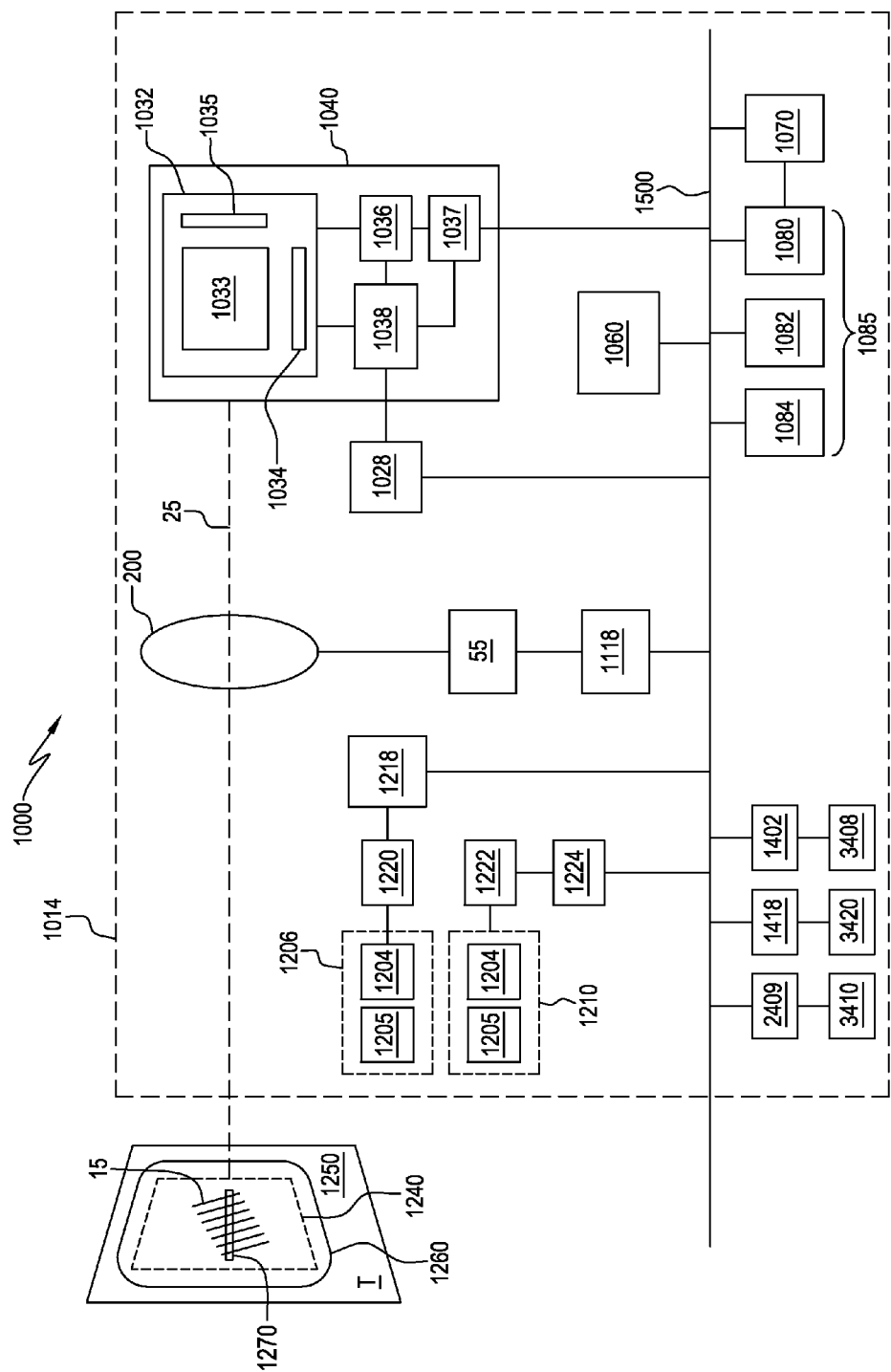
FIG. 7 is a block diagram of an imaging apparatus.

In FIG. 7 there is shown a lens assembly 200 including lens element 10 disposed in an image sensor based imaging apparatus 1000. The imaging apparatus set forth in FIG. 7 can be an indicia reading apparatus in one embodiment. In one embodiment apparatus 1000 is capable of reading, e.g., bar codes and OCR characters.

Imaging apparatus 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data.

In the course of operation of apparatus 1000 image signals can be read out of image sensor 1032, converted and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in memory 1080 and subject such image data to various image processing algorithms. Apparatus 1000 can include a direct memory access unit (DMA) 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of apparatus 1000, lens assembly 200 can be adapted for focusing an image of a decodable indicia 15 located within a field of view 1240 on a substrate 1250 onto image sensor array 1033. Imaging light rays can be transmitted about imaging axis 25. Lens assembly 200 can be adapted to be capable of multiple focal lengths and multiple best focus distances.

Apparatus 1000 can also include an illumination pattern light source bank 1204 and associated light shaping optics 1205 for generating an illumination pattern 1260 substantially corresponding to a field of view 1240 of apparatus 1000. The combination of bank 1204 and optics 1205 can be regarded as an illumination pattern generator 1206. Apparatus 1000 can also include an aiming pattern light source bank 1208 and associated light shaping optics 1209 for generating an aiming pattern 1270 on substrate 1250. The combination of bank 1208 and optics 1209 can be regarded as an aiming pattern generator 1210. In use, apparatus 1000 can be oriented by an operator with respect to a substrate 1250 bearing decodable indicia 15 in such manner that aiming pattern 1270 is projected on a decodable indicia 15. In the example of FIG. 7, decodable indicia 15 is provided by a 1D bar code symbol. Decodable indicia 15 could also be provided by a 2D bar code symbol or optical character recognition (OCR) characters. Each of illumination pattern light source bank 1204 and aiming pattern light source bank 1208 can include one or more light sources. Lens assembly 200 can be controlled with use of electrical power input unit 55 which provides energy for changing a plane of optimal focus of lens assembly 200. In one embodiment, an electrical power input unit 55 can operate as a controlled voltage source, and in another embodiment, as a controlled current source. Electrical power input unit 55 can comprise voltage source 1155 as set forth in FIGS. 1 and 3. Illumination pattern light source bank 1204 can be controlled with use of illumination pattern light source control circuit 1220. Aiming pattern light source bank 1208 can be controlled with use of aiming pattern light source bank control circuit 1222. Electrical power input unit 55 can apply signals for changing optical characteristics of lens assembly 200, e.g., for changing a focal length and/or a best focus distance of (a plane of optimum focus of) lens assembly 200. In one embodiment, electrical power input 55 can comprise voltage source 1155 and can further comprise an SMB274 programmable lens vector LVAF device of the type available from Summit Microelectronics Inc., of Sunnyvale, Calif. Electrical power input unit 55 can vary one or more of an applied voltage amplitude or applied frequency for purpose of changing a lens setting. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a lumen of illumination output by aiming pattern light source bank 1208.

Apparatus 1000 can also include a number of peripheral devices including trigger 3408 which may be used to make active a trigger signal for activating frame readout and/or certain decoding processes and/or other processes. Apparatus 1000 can be adapted so that activation of trigger 3408 activates a trigger signal and initiates a decode attempt. Specifically, apparatus 1000 can be operative so that in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). CPU 1060 can be operational to subject one or more of the succession of frames to a decode attempt. For attempting to decode a bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup.

Apparatus 1000 can include various interface circuits for coupling various of the peripheral devices to system address/data bus (system bus) 1500, for communication with CPU 1060 also coupled to system bus 1500. Apparatus 1000 can include interface circuit 1028 for coupling image sensor timing and control circuit 1038 to system bus 1500, interface circuit 1118 for coupling electrical power input unit 55 to system bus 1500, interface circuit 1218 for coupling illumination light source bank control circuit 1220 to system bus 1500, interface circuit 1224 for coupling aiming light source bank control circuit 1222 to system bus 1500, and interface circuit 1402 for coupling trigger 3408 to system bus 1500. Apparatus 1000 can also include a display 3420 coupled to system bus 1500 and in communication with CPU 1060, via interface 1418, as well as pointer mechanism 3410 in communication with CPU 1060 via interface 2409 connected to system bus 1500.

A succession of frames of image data that can be captured and subject to the described processing can be full frames (including pixel values corresponding to the maximum number of pixels subject to readout during a course of operation of apparatus 1000). In one example a maximum number of pixels is each pixel of image sensor array 1033. A succession of frames of image data that can be captured and subject to the described processing can also be "windowed frames" comprising pixel values corresponding to less than a maximum number of pixels subject to readout during a course of operation of apparatus 1000. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Apparatus 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

Further regarding apparatus 1000, an electrical power input applied by electrical power input unit 55 for establishing a desired lens setting of lens assembly 200 can be responsive, e.g., to a sensed condition or an operator input command.

Figure 8:
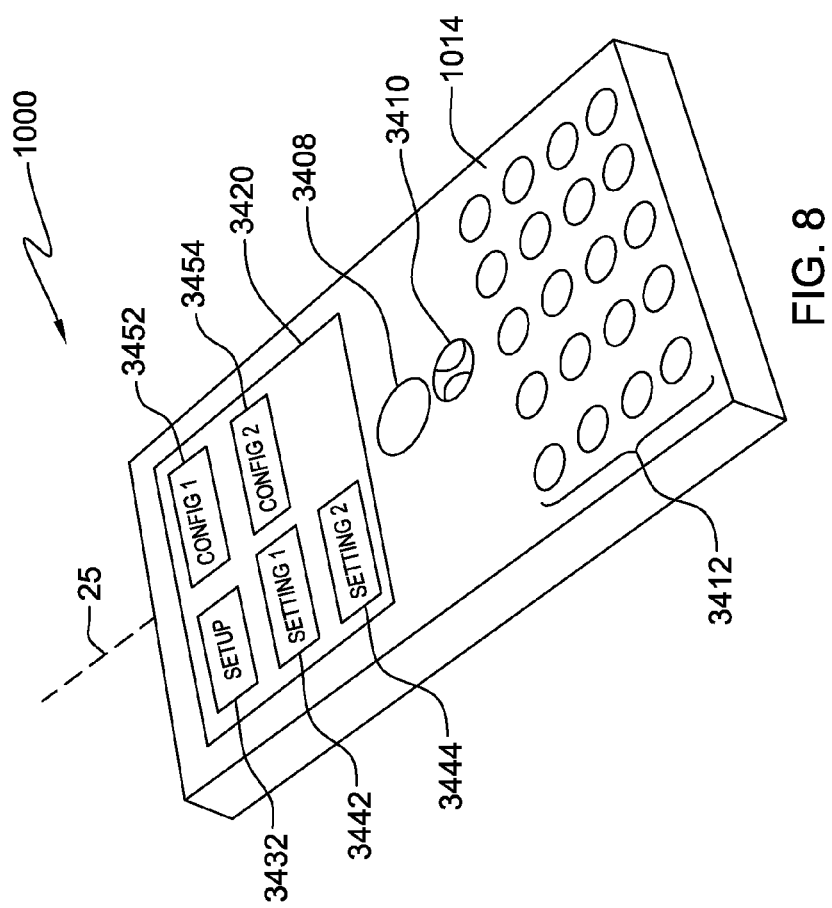
FIG. 8 is a physical form of an imaging apparatus.

A physical form view of apparatus 1000 in one embodiment is shown in FIG. 8. Display 3420, trigger 3408, and pointer mechanism 3410 can be disposed on a common side of a hand held housing 1014 as shown in FIG. 8. Display 3420, trigger 3408 pointer mechanism 3410, and keyboard 3412 in combination can be regarded as a user interface of apparatus 1000. A user interface of apparatus 1000 can also be provided by configuring apparatus 1000 to be operative to be reprogrammed by decoding of programming bar code symbols. In one embodiment, display 3420 of FIG. 8 can be a touch screen display, and the mechanical actuators 3408, 3410, 3412 can be replaced by virtual actuators. A hand held housing 1014 for apparatus 1000 can in another embodiment be devoid of a display and can be in a gun style form factor.

Referring to apparatus 1000, apparatus 1000 can be operative to change a lens setting of lens assembly 200 between at least a first plane of optimum focus setting and a second plane of optimum focus setting. Apparatus 1000 can be operative to expose a first frame of image data with the lens assembly 200 defining a plane of optimum focus distance "a" from apparatus 1000 and can further be operative to expose a second frame of image data with the lens assembly 200 defining a plane of optimum focus distance "b" from apparatus 1000. The "a" distance can be a steady state distance corresponding to a lens setting of the lens assembly 200. The "a" distance can alternatively be a changing (dynamically variable) distance that is intermediate of first and second plane of optimum focus distances corresponding to first and second lens settings of the lens assembly 200. The "b" distance can be a steady state distance corresponding to a lens setting of the lens assembly 200. The "b" distance can alternatively be a changing (dynamically variable) distance that is intermediate of first and second plane of optimum focus distances corresponding to first and second lens settings of the lens assembly 200. The first lens setting can be e.g. a maximally far focus lens setting, a minimally near focus lens setting, or a lens setting intermediate a maximally far focus and a minimally near focus lens setting. The second lens setting can be e.g. a maximally far focus lens setting, a minimally near focus lens setting, or a lens setting intermediate a maximally far focus and a minimally near focus lens setting.

Apparatus 1000 can further be configured so that the apparatus 1000 is operative to subject each of the first and second frames of image data to a decode attempt for decoding of a decodable indicia. The second frame can be a successive frame in relation to the first frame or a non-successive subsequent frame in relation to the first frame. The first and second frames can have exposure periods occurring responsively to a single operator initiated read attempt, or exposure periods occurring responsively to separate first and second different operator initiated read attempts.

Apparatus 1000 can be operative so that apparatus 1000, when an operator activated read attempt is actuated by actuation of trigger 3408, can capture a succession of frames and subject one or more of the frames to a decode attempt until a time that the operator activated read attempt is deactivated, e.g., by release of trigger 3408 or a successful decode or a timeout condition being satisfied. In another aspect, apparatus 1000 in a first operator activated configuration set forth herein can be operative so that lens assembly 200 defines different plane of optimum focus distances during a time that the apparatus 1000 executes an operator activated read attempt of the apparatus. In one example, apparatus 1000 in a first configuration can be operative to change a lens setting of lens assembly 200 between at least first and second lens settings. Further, the apparatus be operative so that first and second frames utilized for a decode attempt are frames exposed (having frame exposure times) during a single operator activated read attempt of the apparatus.

Apparatus 1000 in a second operator activated configuration set forth herein can be operative to maintain a lens setting of apparatus 200 at a certain fixed (steady state) lens setting during a time that the apparatus executes an operator activated read attempt of the apparatus. Lens assembly 200 can define a certain plane of optimum focus distance when a lens setting is established. In addition, apparatus 1000 can be operative to change a lens setting of lens assembly 200 in accordance with an operator input command input subsequent to a first operator activated read attempt and prior to a second operator activated read attempt. Apparatus 1000 can be further operative so that a first frame and a second frame utilized for a decode attempt are frames exposed during separate first and second separate operator activated read attempts of the apparatus 1000.

Apparatus 1000 can have a user interface comprising a display 3420 and pointer mechanism 3410, and a user can utilize the user interface to select a lens setting by selection of a displayed button 3442, 3444 corresponding to the desired lens setting. Apparatus 1000 can further be operative so that when trigger 3408 is actuated to activate a read attempt, apparatus 1000 maintains the lens setting at the selected lens setting through the capture of a plurality of frames, including the first and second frames when attempting to decode a decodable indicia in response to a trigger signal being made active to initiate a decode attempt with use of trigger 3408. An operator can select between a first configuration (lens setting changes during read attempts) and second configuration (lens setting is maintained in a steady state through a read attempt) using the user interface of apparatus 1000 by selection of a button 3452 (first configuration, changing lens setting), or button 3454 (second configuration, fixed setting lens setting), corresponding to the desired configuration.

Further aspects of apparatus 1000 in one embodiment are described with reference to the timing diagram of FIG. 9. The timing diagram of FIG. 9 illustrates apparatus 1000 undergoing a change in configuration from a first configuration in which variable lens assembly 200 defines different plane of optimum focus distances from apparatus 1000 during a read attempt to a second configuration in which a variable lens of apparatus 1000 remains at a fixed lens setting throughout an operator initiated read attempt.

Figure 9:
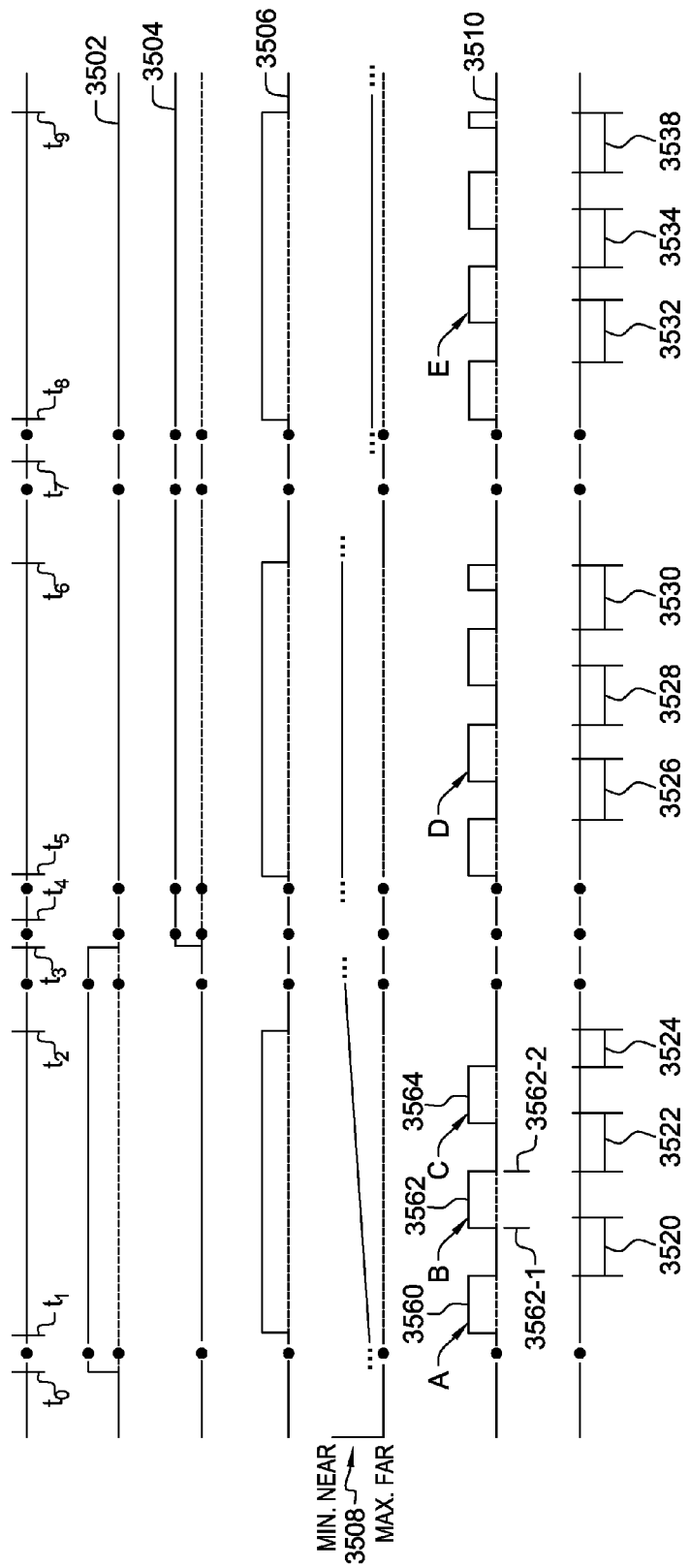
FIG. 9 is a timing diagram operation of an imaging apparatus.

Referring to the timing diagram of FIG. 9, signal 3502 is a state signal representing an active or inactive state of the first user selectable configuration. Signal 3504 is a state signal representing the state of a second described user selectable configuration. Signal 3506 is a trigger signal which can be made active by actuation of trigger 3408, and which can be deactivated by releasing of trigger 3408 which may become inactive after a time out period or after a successful decode of a decodable indicia. Plot 3508 represents planes of optimum focus distances of apparatus 1000 which may be changed by changing a lens setting of lens assembly 200. In one embodiment, a lens setting of lens assembly 200 can be varied between a maximally far focus lens setting and a minimally near focus lens setting. Signal 3510 is an exposure control signal. The exposure control signal transitions from active to inactive states. Exposure periods of apparatus 1000 are represented by the active state periods of signal 3510.

Referring to processing periods 3520, 3522, 3524, 3526, 3528, 3530, 3532, 3534, 3538, the noted processing periods can represent processing periods during which time CPU 1060 of apparatus 1000 processes stored (e.g., buffered) image data, e.g., for attempting to decode a decodable indicia, and/or for performance of frame quality determination.

With further reference to the timing diagram of FIG. 9, an operator at time $t_0$ can select configuration 1 using e.g., button 3452 (Configuration 1) so that apparatus 1000 is set in a configuration in which a plane of optimum focus distance defined by lens assembly 200 will vary during a read attempt. A plane of optimum focus distance can be measured as a distance from apparatus 1000. At time $t_1$, an operator can activate trigger signal 3506. In response to trigger signal 3506 being activated apparatus 1000 can expose a plurality of frames of image data.

Referring to the timing diagram of FIG. 9, the signal input characteristics for establishing a plane of optimum focus distance defined by lens assembly 200 as represented by plot 3508 may be such that the plane of optimum focus distance dynamically varies during each of respective exposure periods 3560, 3562, 3564 when apparatus 1000 operates in a first (dynamic plane of optimum focus distance) configuration. That is, for example, lens assembly 200 (as well as lens element 10) can have a different focal length and optical power (in terms of diopter) at timepoint 3562-2 than it does at timepoint 3562-1. At time $t_2$, trigger signal 3506 can be deactivated e.g., by successful decode or a release of trigger 3408. At time $t_3$, an operator can activate the second configuration as described herein e.g., by actuation of button 3454 (Configuration 2, steady state lens setting). Sometime thereafter, at time $t_4$ an operator may manually select a lens setting of lens assembly 200 e.g., by actuation of a lens setting button 3442, 3444 of apparatus 1000 or other provided buttons if apparatus 1000 is adapted so that further lens settings are available.

Referring to plane of optimum focus distance plot 3508, plot 3508 indicates a plane of optimum focus distance defined by lens assembly 200 over time can be established by applying signals of appropriate characteristics to lens element 10. At time $t_5$, a trigger signal 3506 can be activated again, e.g., by an operator actuation of trigger 3408. A plurality of exposure periods can ensue responsively to the trigger signal activation as seen by signal 3510. When operating in the second configuration, an energization input into lens assembly 200 can be established so that a setting of lens assembly 200 can remain constant at a fixed (steady state) lens setting. At time $t_6$, trigger signal 3506 can be deactivated e.g., by a release of trigger 3408 or by a successful decode of a message. At time $t_7$, with apparatus 1000 still operating in the second configuration, an operator can cause a change in a lens setting to a different lens setting e.g., by using a lens setting selection button 3442, 3444 of apparatus 1000. In response thereto, energization characteristics for input energy input into lens assembly 200 can be input to establish a targeted lens setting as is seen by plot 3508. A trigger signal 3506 can thereafter be activated again at time $t_8$ and a plurality of exposure periods can ensue with a lens setting remaining at a setting corresponding to the fixed lens setting energization level represented by plot 3508.

In the second configuration, a lens setting of lens assembly 200 can remain fixed throughout a read attempt. A fixed setting can be different depending on the current application. For example, for a document reading application, the desired fixed lens setting can be about 300 mm. For a warehouse indicia reading application, a desired fixed lens setting can be about 45 ft. For a retail hand held reader, a desired fixed lens setting can be about 3 ft. For a manufacturing indicia reading application, a desired lens setting can be about 12 inches.

Figure 10:
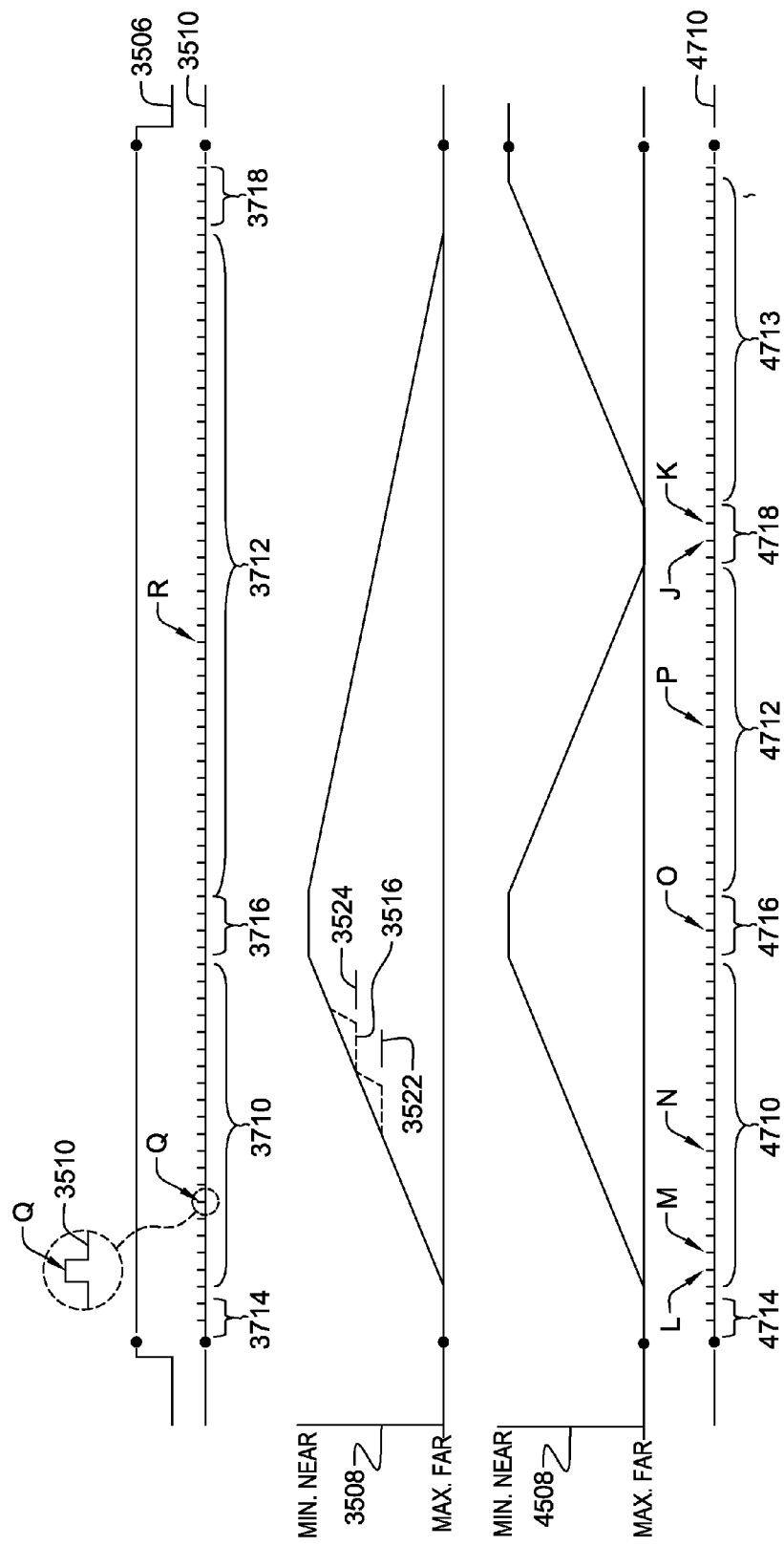
FIG. 10 is a timing diagram illustrating operation of an imaging apparatus.

As seen in the timing the diagram of FIG. 7, the timing diagram of FIG. 10 illustrates operation of apparatus 1000 over a series of frames, responsively to a trigger signal activation. Referring to FIG. 10, signal 3506 is a trigger signal which can be activated in a manner set forth with reference to FIG. 9. Signal 3510 is an exposure control signal. The "tick marks" of FIG. 10 indicate exposure periods of apparatus 1000. Plot 3508 is a plot of plane of optimum focus distance defined by lens assembly 200 which can range from a maximally far field (far focus) lens setting plane of optimum focus distance to minimally near field (near focus) lens setting focus distance. Following each exposure period there can be a processing period (as expressly depicted in the timing diagram of FIG. 9) in which CPU 1060 of apparatus 1000 can process the frame, e.g., for attempting to decode and/or for frame quality evaluation processing. As illustrated in FIG. 10, apparatus 1000 can cause a lens setting of lens assembly 200 to "cycle" between a maximally far focus lens setting and minimally near focus lens setting responsively to a trigger signal activation. As indicated by dashed line 3516 lens assembly 200 can be configured in one embodiment so that additional lens settings (e.g., defining the plane of optimum focus distance 3522 and distance 3524) can be established intermediate a maximally far focus lens setting and a minimally near focus lens setting. When a lens setting is established a plane of optimum focus can be defined at a certain known distance from apparatus 1000, e.g., distance 3522 and distance 3524.

Apparatus 1000 in one embodiment can take advantage of a continuous focal length change of a liquid crystal lens element over a control voltage range. This is, during exposure periods within periods 3710, and 3712 of FIG. 10, planes of optimum focus distances defined by lens assembly 200 can be dynamic distances (changing during the course of each exposure period within periods 3710 and 3712). Notwithstanding, if the exposure periods are short enough, image quality can remain high (with minimized motion blur) notwithstanding changing plane of optimum focus distances. During each exposure period of period 3710 illustrated in FIG. 10, lens element 10 can be driven in accordance with the driving characteristics set forth with reference to period 1264 illustrated in FIG. 4. During period 3712 illustrated in FIG. 10, lens element 10 can be driven in accordance with the driving characteristics set forth with reference to period 1268 illustrated in FIG. 4 (voltage in a removed state). In one example, image sensor integrated circuit 1040 can be provided by an MT9V022 image sensor integrated circuit available from Micron Technology with global shutter operation operative so that each row of pixels of image sensor array 1033 subject to readout can have a common exposure start time and a common (simultaneous) exposure termination time. With use of a global shutter CMOS image sensor integrated circuit as circuit 1040 with fast enough frame rate and short enough exposure time, an apparatus 1000 can continually decode each frame while the liquid crystal lens is set to cycling through focusing from a maximally far focus lens setting to a minimally near focus lens setting and back again in an open loop manner. In such an embodiment plane of optimum focus distances defined by lens assembly 200 during each exposure period of period 3710 and period 3712 can be dynamically changing distances changing slightly from a first value to a second value between a commencement and a termination of an exposure period. The different plane of optimum focus distances can be defined by different focal lengths of lens element 10 and of lens assembly 200. Where image sensor integrated circuit 1040 is provided by a global shutter image sensor integrated circuit, a pixel of the image sensor array 1033 can include an opaque shielded storage region that stores subsequent to a certain exposure period and prior to readout a charge representative of light incident on the pixel during the certain exposure period, and wherein the image sensor array is controlled so that the certain exposure period comprises a simultaneous exposure initiation time and simultaneous termination time for a plurality of rows of pixels of the image sensor array 1033. The lens setting of lens assembly 200 in the example of FIG. 10 can be a steady state lens setting during the depicted exposure periods 3714 exposure periods 3716 and exposure periods 3718. With a lens setting established, a plane of optimum focus defined by lens assembly 200 can be at a known steady state distance. With reference to FIG. 10, plot 3508 and signal 3510 can illustrate operation of an imaging apparatus 1000 having a global shutter image sensor integrated circuit 1040 and a lens assembly 200 incorporating an LVAF liquid crystal lens of the type available from LensVector, Inc. of Sunnyvale, Calif.

Since in one described embodiment the focus power change can be relatively slow (on the order of 350 ms from far to near in one embodiment), if the global shutter CMOS exposure time is set up as 1 ms, then the image blur due to the focus change will be minimized thus produce frames of image data of sufficient quality for attempting to decode. If a 60 frames per second fps CMOS image sensor integrated circuit 1040 is used, within 20 frame times (about 340 ms) there can be expected to be at least several frames of image data in focus that can be decoded thus produce short enough decode time (within about 350 ms if a real time decoder is used).

In one of the preferred embodiments, lens element 10 is provided by a LensVector AutoFocus (LVAF) Liquid Crystal Lens (LC) lens of the type available from LensVector Inc. of Sunnyvale, Calif. It takes about 350 ms to change the focus power from zero to 10 diopter using the noted LVAF lens element 10 in one embodiment. Reversely, it takes about 700 ms to change the focus power from 10 diopter to zero diopter using a lens assembly 200 having the noted LVAF lens element. Lens element 10 in one embodiment can include an integrated lens aperture.

As indicated in the timing diagram of FIG. 10, lens assembly 200 can be controlled to change a lens setting of lens assembly 200 between a maximally far focus lens setting and a minimally near focus lens setting to back and forth. In one example, the change can be on an open loop basis.

Using a global shutter CMOS sensor as image sensor integrated circuit 1040, apparatus 1000 can be continually taking image frames (exposing, reading out and storing image data) in the speed of about 60 frames per second, in one example. It then will take about 20 frames of image data during the lens assembly focus from far to near and then will take about 40 frames of image data during the lens assembly focus from near to far. A decoder system, e.g., provided by CPU 1060 processing frames buffered in memory 1080 can continually decode each frame and signal a decode success if one of the frames is decoded successfully. In one preferred embodiment, a Image Quality Filter (IQfilter) can be used to filter out (discard) those non-focused frames and only pipe those good quality frames to the decoder thus enhance the decode speed if a non-real time decoder is used. In one example, as set forth with reference to FIG. 8, a quality of a frame can be measured in terms of a contrast level of a frame.

Figure 11:
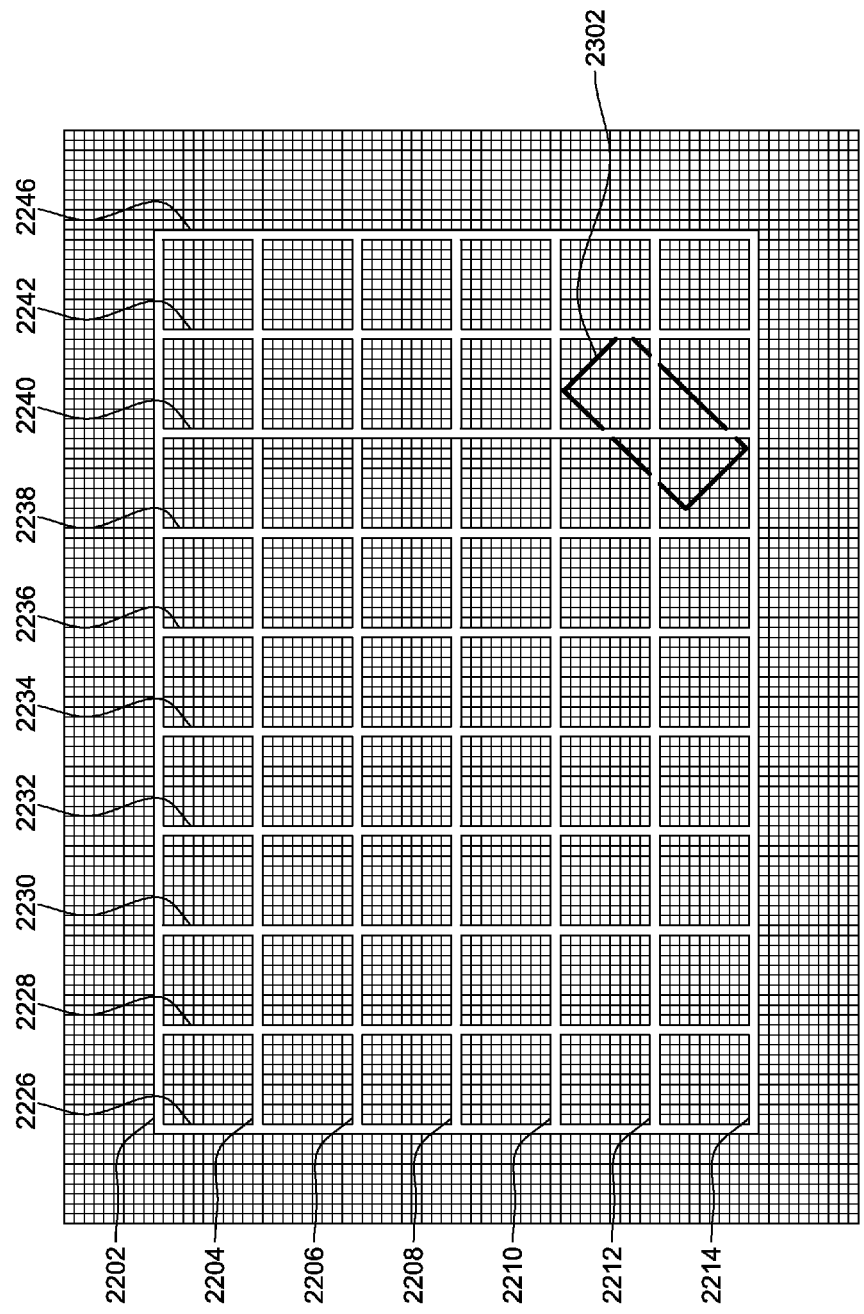
FIG. 11 is a representation of a frame of image data having pixel positions and sampling paths.

In an example of an image quality filter, frame quality evaluation processing can comprise sampling a frame of image data along a plurality of sampling paths and calculating autocorrelation scores for each of the sampling paths, which in one embodiment are depicted in the frame of image data represented in FIG. 11. In one example, sampling paths 2202, 2204, 2206, 2208, 2210, 2212, 2214, 2226, 2228, 2230, 2232, 2234, 2236, 2238, 2240, 2242, 2247. Autocorrelation scores for each path can be determined according to the formula:

$$S_{path}=\Sigma(I_n-I_{n-1})^2 \quad \text{Equation 1}$$

where $I_n$ is the pixel value at a certain pixel position n, of a path, and $I_{n-1}$ is a pixel value at a pixel position adjacent to the $n^{th}$ pixel position. For reduction of clock cycles required for performing the calculation of Equation 1, an approximation of the result of Equation 1 can be carried out by executing the calculation:

$$S_{path}=\Sigma|I_n-I_{n-1}| \quad \text{Equation 2}$$

Further according to a process for evaluating a quality of a frame of image data, a quality score for a frame of image data can be determined utilizing autocorrelation scores for the paths 2202, 2204, 2206, 2208, 2210, 2212, 2214, 2226, 2228, 2230, 2232, 2234, 2236, 2238, 2240, 2242, 2247. In one example, a sum of autocorrelation scores for a frame (which indicates a contrast level of a frame) can be taken as a measure of a quality of a frame. It will be seen that a frame's autocorrelation score will improve the more "in-focus" the frame is. In the example provided, frame quality evaluation is provided as a measure of contrast in a given frame of image data.

In yet another preferred embodiment, lens element 10 can be provided by a dual frequency nematic liquid crystal lens element as set forth in FIG. 1. A dual frequency nematic liquid crystal lens element 10 features the advantages of an approximately equal duration of focus far to near and near to far (maximally far focus lens setting to minimally near focus lens setting and vice versa). For example, in one embodiment, both directions take only 350 ms. Thus, a time to complete one open loop cycle of focusing far to near then near to far can be shortened. Accordingly, an overall decode time can be shortened, and small image blurs of various frames attributed to a plane of optimum focus distance being dynamically variable during an exposure period can be provided to be more consistent between frames, thereby simplifying image processing and rendering results of image processing more consistent. Referring to plot 4508 and signal 4710, plot 4508 and signal 4710 illustrate operation of apparatus 1000 where image sensor integrated circuit 1090 is provided by a global shutter image sensor integrated circuit and wherein lens element 10 is a dual frequency nematic liquid crystal lens element. In one embodiment, lens element 10 during period 4710 can be driven in accordance with the driving characteristics set forth with reference to period 1164 of FIG. 2. Lens element 10 during period 4712 can be driven in accordance with the driving characteristic set forth with reference to period 1168 of FIG. 2. In one embodiment with reference to the timing diagram of FIG. 10, a time to focus from near to far is between 80% and 120% of the time to focus from far to near. In another embodiment, the transition times (durations) are 40% to 160% of one another and in another embodiment, the transition times are within 50% to 150% of one another. In one example a time to focus between near and far is within 30 ms of time to focus between far and near. In one embodiment the time to focus difference is less than 10ms. The image quality filter processing set forth herein can be utilized with an apparatus operating in accordance with plot 4508 and signal 4710.

This is set forth herein an apparatus comprising an image sensor array having a plurality of pixels, a memory for storing (e.g., buffering) image data, wherein the apparatus 1000 is adapted for processing the image data for attempting to decode decodable indicia represented in the image data, a lens assembly for focusing an image of a target onto the image sensor array 1033, the variable lens assembly 200 including a lens element 10 having a first light transmissive substrate and a second light transmissive substrate, the first light transmissive substrate including a first electrode, the second light transmissive substrate including a second electrode, the lens element further having liquid crystal material disposed between the first substrate and the second substrate, the apparatus 1000 further being operative to expose during a first exposure period a first frame of image data with the lens assembly defining a plane of optimum focus distance "a" from apparatus 1000 and during a second exposure period a second frame of image data with the lens assembly defining a plane of optimum focus distance "b" from apparatus 1000, and wherein the apparatus 1000 is further configured so that the apparatus 1000 is operative to subject each of the first and second frames of image data to a decode attempt for decoding of a decodable indicia. The first and second exposure periods can be exposure periods described herein with reference to FIGS. 9 and 10. In one embodiment the first and second exposure periods can be the exposure periods A and B (FIG. 9). In one embodiment the first and second exposure periods can be the exposure periods A and C. In one embodiment the first and second exposure periods can be the exposure periods B and D. In one embodiment the first and second exposure periods can be the exposure periods D and E. In one embodiment the first and second exposure periods can be the exposure periods J and K (FIG. 10). In one embodiment the first and second exposure periods can be the exposure periods L and M. In one embodiment the first and second exposure periods can be the exposure periods L and N. In one embodiment the first and second exposure periods can be the exposure periods L and O. In one embodiment the first and second exposure periods can be the exposure periods R and R. In one embodiment the first and second exposure periods can be the exposure periods L and P. In one embodiment the first and second exposure periods can be the exposure periods Q and R. A plane of optimum focus distance defined by lens assembly 200 during each exposure period A, B, C, Q, L, M, N is a changing (dynamically varying) plane of optimum focus distance changing by virtue of lens assembly 200 transitioning from a maximally far focus lens setting to a minimally near focus lens setting. A plane of optimum focus distance defined by lens assembly 200 during each of exposure period D, E, O, J and K is a known predetermined plane of optimum focus distance corresponding to a fixed focus lens setting of lens assembly 200. A plane of optimum focus distance defined by lens assembly 200 during each of exposure period R and D is changing (dynamically varying) plane on optimum focus distance changing by virtue of a lens setting transitioning between a minimally near focus lens setting and a maximally far focus lens setting. Other examples are illustrated by the noted examples.

Figure 12:
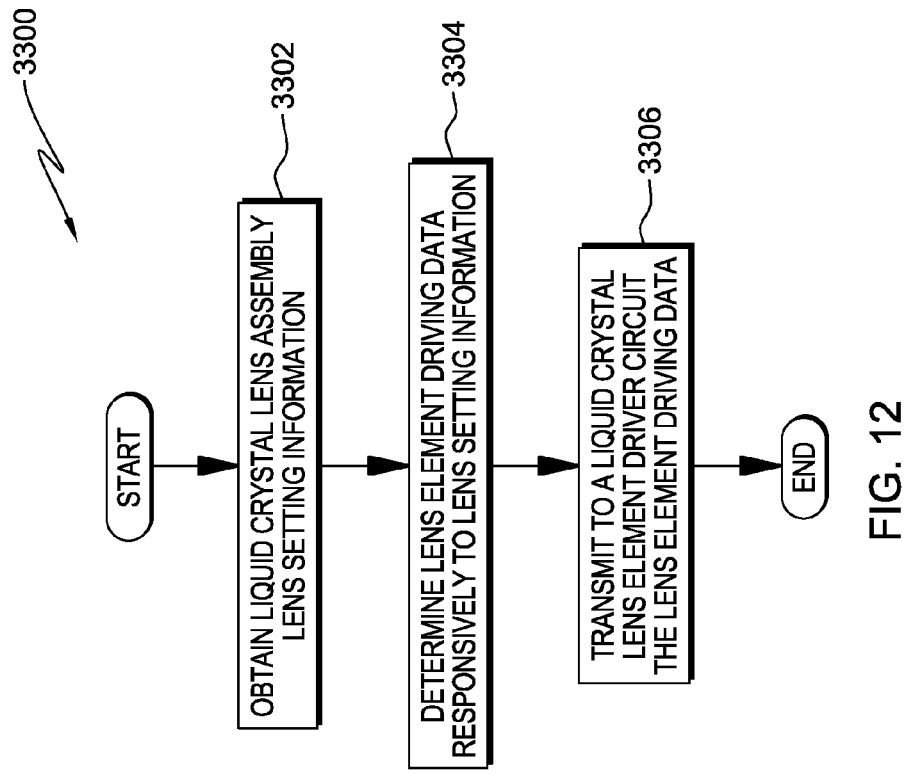
FIG. 12 is a flow diagram illustrating operation of a program for use in driving a lens element.

In one embodiment, a liquid crystal lens element 10 is used not for continual focusing, but is used for providing software configurable fixed focus product. For example, a hand held image reading apparatus 1000 with a standard range focus configuration is set to focus at around 7 inch, a high density focus configuration focus at 4 inch and an extended range focus at 12 inch. So for different focus configurations, a control voltage can be established by software to define SR, HD or ER with one product stock keeping unit (SKU) instead of three SKUs. In one embodiment, apparatus 1000 is restricted from operating in other than the second configuration (fixed focus lens). In one embodiment, CPU 1060 of apparatus 1000 can be operative to run the computer executable program 3300 having the steps as are indicated in FIG. 12. The steps indicated in FIG. 12 can be executed intermediate of operator initiated decode attempts. At block 3302 program 3300 can obtain liquid crystal lens assembly lens setting information from a configuration resource. In one example, CPU 1060 at block 3202 obtains a lens setting parameter, e.g., by reading an output of a decoded out programming menu bar code symbol or an output of a configuration parser that parses a received configuration file (e.g., XML configuration file) received from an external CPU-equipped apparatus. At block 3304, program 3300 can determine lens element driving data responsive by to lens setting information in one example CPU 1060 at block 3304 can obtain a drive frequency corresponding to the lens setting, e.g., by the reading the drive frequency from a memory, e.g., memory 1082 or 1084 of apparatus 1000. At block 3306, program 3300 can transmit to a lens element driver circuit 55 lens element driving data. For example, at block 3306 program 3300 can transmit signals e.g., parameter to circuit 55 to drive the lens element 10 at a certain, e.g., a fixed drive frequency until a certain lens setting is established to define a steady state plane of optimum focus distance. Program 3300 can be stored on a non-transitory computer readable medium, e.g., memory 1082 or 1084. The computer readable medium can be e.g., a semiconductor integrated circuit based memory device, a compact disk, floppy disk, thumb drive, a flash memory device, a hard drive. Program 3300 can be stored on a memory of an external CPU-equipped apparatus (e.g., a server, an external apparatus configured in the manner of apparatus 1000), and downloaded to apparatus. Program 3300 can be stored on a memory device that is physically transportable, e.g., compact disk, floppy disk, thumb drive.

There is set forth herein computer program product for establishing a liquid crystal lens assembly lens setting, the computer program product comprising: a computer readable storage medium readable by a processing circuit and storing instructions for execution by the processing circuit for performing a method comprising: obtaining, by a processor, a liquid crystal lens assembly lens setting information from a configuration resource; determining, by the processor, responsively to the lens setting information lens element driving data; transmitting, by the processor, to a liquid crystal lens element driver circuit, the lens element driving data. There is also set forth herein a computer program product wherein the transmitting is to establish a steady state fixed focus lens setting of the liquid crystal lens assembly 200. There is also set forth herein a computer program product wherein the method further includes enabling activation of a trigger signal by an operator subsequent to an establishing of the steady state fixed focus lens setting, e.g., computer program instructions executable by CPU 1060 can be provided so that apparatus 1000 is operative so that trigger signal 3506 (FIG. 9) is restricted from being made active until a time that a lens setting of lens assembly 200 is established so that a stable and steady state plane of optimum focus distance is defined.

A small sample of systems methods and apparatus that are described herein is as follows:

A1. An apparatus comprising: an image sensor array having a plurality of pixels, a memory for storing image data, wherein the apparatus is adapted for processing the image data for attempting to decode decodable indicia represented in the image data, a variable lens assembly for focusing an image of a target onto the image sensor array, the variable lens assembly including a lens element having a first light transmissive substrate and a second light transmissive substrate, the first light transmissive substrate including a first electrode, the second light transmissive substrate including a second electrode, the lens element further having liquid crystal material disposed between the first substrate and the second substrate, the apparatus further being operative to expose during a first exposure period a first frame of image data with the lens assembly defining a plane of optimum focus distance "a" from the apparatus and during a second exposure period a second frame of image data with the lens assembly defining a plane of optimum focus distance "b" from the apparatus, and wherein the apparatus is further configured so that the apparatus is operative to subject each of the first and second frames of image data to a decode attempt for decoding of a decodable indicia. A2. The apparatus of A1, wherein the lens assembly is transitioning between lens settings during the first exposure period so that distance "a" is a changing distance increasing or decreasing during the first exposure period. A3. The apparatus of A1, wherein the lens assembly is at a certain lens setting during the first exposure period so that distance "a" is fixed distance. A4. The apparatus of A1, wherein the lens assembly is at a maximally far focus lens settings during the first exposure period so that distance "a" is a fixed distance, and wherein the lens assembly is at a minimally near focus lens setting during the second exposure period so that distance "b" is a fixed distance. A5. The apparatus of A1, wherein the liquid crystal material has a positive sign of dielectric anisotropy for a first set of frequencies of applied electric field lower than a crossover frequency and a negative sign of dielectric anisotropy for a second frequencies of applied electric field higher than a crossover frequency. A6. The apparatus of A5, wherein the apparatus is operative to change a lens setting of the lens assembly from a first lens setting to a second lens setting by applying a drive voltage to the lens element at a first frequency lower than the crossover frequency, wherein the apparatus is further operative to change a lens setting of the lens assembly from the second lens setting to the first lens setting by applying a drive voltage to the lens element at a second frequency higher than the crossover frequency. A7. The apparatus of A6, wherein the first lens setting is a maximally far focus lens setting, and wherein the second lens setting is a minimally near focus lens setting. A8. The apparatus of A6, wherein the distances "a" and "b" are intermediate plane of optimum focus distances defined by the lens assembly at the first and second lens settings. A9. The indicia reading apparatus of A5, wherein the apparatus is operative to drive the lens element at first frequency below the crossover frequency and at a second frequency above the crossover frequency during a single operator activated read attempt, the first exposure period occurring with the lens element being driven at the first frequency, the second exposure period occurring with the lens element being driven at the second frequency. A10. The apparatus of A1, wherein the apparatus is operative to change a lens setting of lens assembly from a first lens setting to a second lens setting by applying a drive voltage to the lens element at a first frequency, wherein apparatus is further operative to change a lens setting of the lens assembly from the second lens setting to the first lens setting by applying a drive voltage to the lens element at a second frequency, the second frequency being higher than the first frequency. A11. The apparatus of A1, wherein the apparatus is operative to change a lens setting of the lens assembly from a first lens setting to a second lens setting by applying a drive voltage to the lens element at a first frequency, wherein apparatus is further operative to change a lens setting of the lens assembly from the second lens setting to the first lens setting by removing a drive voltage from the lens element, the removal of a drive voltage resulting in a return of a lens setting of the lens element to the first lens setting. A12. The apparatus of A1, wherein the apparatus is operative so that the first exposure period occurs during a time in which a lens setting of the lens assembly is transitioning from a first lens setting to a second lens setting with the plane of optimum focus distance "a" being a changing distance intermediate of a plane of optimum focus distance defined at the first lens setting and a plane of optimum focus distance defined at the second lens setting, the apparatus further being operative so that the second exposure period occurs during a time in which a lens setting of the lens assembly is transitioning from the second lens setting to the first lens setting with the plane of optimum focus distance "b" being a changing distance intermediate of a plane of optimum focus distance defined at the second lens setting and a plane of optimum focus distance defined at the first lens setting. A13. The apparatus of A1, wherein the apparatus is operative so that the first exposure period occurs during a time at which the lens element is being driven with a sinusoidal drive voltage, and further so that the second exposure period occurs during a time at which a drive voltage is in a removed state in relation to the lens element. A14. The indicia reading apparatus of A1, wherein the apparatus is further operative so that the first and second frames are exposed responsively to a single operator initiated read attempt of the apparatus. A15. The indicia reading apparatus of A1, wherein the apparatus is operative to maintain a lens setting of the lens assembly at a certain lens setting during a time that the apparatus executes an operator activated read attempt of the apparatus, wherein the plane of optimum focus distance "a" is a fixed distance defined with a lens setting of the lens assembly being at a first lens setting, wherein the plane of optimum focus distance "b" is a fixed distance defined with a lens setting of the lens assembly being at a second lens setting, the apparatus being operative to change the lens setting in accordance with an operator input command input subsequent to a first operator activated read attempt and prior to a second operator activated read attempt, the apparatus further being operative so that the first frame and the second frame are exposed during separate first and second separate operator activated read attempts of the apparatus. A16. The indicia reading apparatus of A1, wherein the apparatus is operative to drive the lens element at a first frequency and at a second frequency, the first exposure period occurring with the lens element being driven at the first frequency, the second exposure period occurring with the lens element being driven at the second frequency, the second frequency being different than the first frequency. A17. The indicia reading apparatus of A1, wherein the lens assembly is configured so that a first transition time between a maximally far focus lens setting and a minimally near focus lens setting is between 40 percent and 160 percent of a duration of a second transition time between the minimally near focus lens setting and maximally far focus lens setting. A18. The indicia reading apparatus of A1, wherein the lens assembly is configured so that a first transition time between a maximally far focus lens setting and a minimally near focus lens setting is between 80 percent and 120 percent of a duration of a second transition time between the minimally near focus lens setting and maximally far focus lens setting. A19. The indicia reading apparatus of A1, wherein the lens assembly is configured so that a first transition time between a maximally far focus lens setting and a minimally near focus lens setting is less than 30 ms. A20. The indicia reading apparatus of A1, wherein the first frame and the second frame are successive frames. A21. The apparatus of A1, wherein the apparatus is configured so that the first exposure period and second exposure period occur during a time at which a lens setting of the lens assembly is transitioning between a farther plane of optimum focus lens setting and a nearer plane of optimum focus lens setting. A22. The apparatus of A1, wherein the apparatus is configured so that the first exposure period and second exposure period occur during a time at which a lens setting of the lens assembly is transitioning between a farther plane of optimum focus lens setting and a nearer plane of optimum focus lens setting, wherein one or more of the plane of optimum focus distances "a" and "b" is a changing distance intermediate of a plane of optimum focus distance defined at the farther plane of optimum focus lens setting and a plane of optimum focus distance defined at the nearer focus plane of optimum focus lens setting, wherein a pixel of the image sensor array has a shielded storage region that stores subsequent to the first exposure period and prior to readout a charge representative of light incident on the pixel during the first exposure period, and wherein the image sensor array is controlled so that the first exposure period comprises a simultaneous exposure initiation time and a simultaneous exposure termination time for a plurality of rows of pixels of the image sensor array. A23. The apparatus of A1, wherein the apparatus is further operative to expose during a third exposure period a third frame of image data with the lens assembly defining a plane of optimum focus distance "c" from the apparatus, and wherein the apparatus is operative to discard the third frame of image data responsively to a quality evaluation of the third frame of image data.

B1. An apparatus comprising: an image sensor array having a plurality of pixels, a memory for storing image data, wherein the apparatus is adapted for processing the image data for attempting to decode decodable indicia represented in the image data, a lens assembly for focusing an image of a target onto the image sensor array, the variable lens assembly including a lens element having a first light transmissive substrate and a second light transmissive substrate, the first light transmissive substrate including a first electrode, the second light transmissive substrate including a second electrode, the lens element further having liquid crystal material disposed between the first substrate and the second substrate, the apparatus further being operative to expose during a first exposure period a first frame of image data with the lens assembly defining a plane of optimum focus distance "a" from the apparatus, and wherein the apparatus is further configured so that the apparatus is operative to subject the first frame of image data to a decode attempt for decoding of a decodable indicia, wherein the apparatus is configured so that the first exposure period occurs during a time at which a lens setting of the lens assembly is transitioning between a farther plane of optimum focus lens setting and a nearer plane of optimum focus lens setting, the plane of optimum focus distance "a" being intermediate a plane of optimum focus distance defined at the farther plane of optimum focus lens setting and a plane of optimum focus distance defines at the nearer plane of optimum focus lens setting, wherein a pixel of the image sensor array has a shielded storage region that stores subsequent to the first exposure period and prior to readout a charge representative of light incident on the pixel during the first exposure period, and wherein the image sensor array is controlled so that the first exposure period comprises a simultaneous exposure initiation time and simultaneous termination time for a plurality of rows of pixels of the image sensor array. B2. The apparatus of B1, wherein the plane of optimum focus distance "a" is changing distance so that the distance "a" has a first value at a commencement of the first exposure period and a second value at the termination of the first exposure period.

C1. A computer program product for establishing a liquid crystal lens assembly lens setting, the computer program product comprising: a computer readable storage medium readable by a processing circuit and storing instructions for execution by the processing circuit for performing a method comprising: obtaining, by a processor, a liquid crystal lens assembly lens setting information from a configuration resource; determining, by the processor, responsively to the lens setting information lens element driving data; transmitting, by the processor, to a liquid crystal lens element driver circuit, the lens element driving data. C2. The computer program product of C1, wherein the transmitting is to establish a steady state fixed focus lens setting of the liquid crystal lens assembly. C3. The computer program product of C2, wherein the method further includes restricting activation of a trigger signal by an operator until a time that a steady state fixed focus lens setting of the liquid crystal lens assembly is established.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

I claim:

1. An apparatus comprising:
an image sensor array having a plurality of pixels, a memory for storing image data, wherein the apparatus is adapted for processing the image data for attempting to decode decodable indicia represented in the image data, a variable lens assembly for focusing an image of a target onto the image sensor array, the variable lens assembly including a lens element having a first light transmissive substrate and a second light transmissive substrate, the first light transmissive substrate including a first electrode, the second light transmissive substrate including a second electrode, the lens element further having liquid crystal material disposed between the first substrate and the second substrate, the apparatus further being operative to expose during a first exposure period a first frame of image data with the lens assembly defining a plane of optimum focus distance "a" from the apparatus and during a second exposure period a second frame of image data with the lens assembly defining a plane of optimum focus distance "b" from the apparatus, and wherein the apparatus is further configured so that the apparatus is operative to subject each of the first and second frames of image data to a decode attempt for decoding of a decodable indicia; and
wherein the lens assembly is at a maximally far focus lens settings during the first exposure period so that distance "a" is a fixed distance, and wherein the lens assembly is at a minimally near focus lens setting during the second exposure period so that distance "b" is a fixed distance.

2. The apparatus of claim 1, wherein the lens assembly is transitioning between lens settings during the first exposure period so that distance "a" is a changing distance increasing or decreasing during the first exposure period.

3. The apparatus of claim 1, wherein the lens assembly is at a certain lens setting during the first exposure period so that distance "a" is fixed distance.

4. The apparatus of claim 1, wherein the liquid crystal material has a positive sign of dielectric anisotropy for a first set of frequencies of applied electric field lower than a crossover frequency and a negative sign of dielectric anisotropy for a second frequencies of applied electric field higher than a crossover frequency.

5. The apparatus of claim 4, wherein the apparatus is operative to change a lens setting of the lens assembly from a first lens setting to a second lens setting by applying a drive voltage to the lens element at a first frequency lower than the crossover frequency, wherein the apparatus is further operative to change a lens setting of the lens assembly from the second lens setting to the first lens setting by applying a drive voltage to the lens element at a second frequency higher than the crossover frequency.

6. The apparatus of claim 1, wherein the apparatus is operative to change a lens setting of lens assembly from a first lens setting to a second lens setting by applying a drive voltage to the lens element at a first frequency, wherein apparatus is further operative to change a lens setting of the lens assembly from the second lens setting to the first lens setting by applying a drive voltage to the lens element at a second frequency, the second frequency being higher than the first frequency.

7. The apparatus of claim 1, wherein the apparatus is operative to change a lens setting of the lens assembly from a first lens setting to a second lens setting by applying a drive voltage to the lens element at a first frequency, wherein apparatus is further operative to change a lens setting of the lens assembly from the second lens setting to the first lens setting by removing a drive voltage from the lens element, the removal of a drive voltage resulting in a return of a lens setting of the lens element to the first lens setting.

8. The apparatus of claim 1, wherein the apparatus is operative so that the first exposure period occurs during a time in which a lens setting of the lens assembly is transitioning from a first lens setting to a second lens setting with the plane of optimum focus distance "a" being a changing distance intermediate of a plane of optimum focus distance defined at the first lens setting and a plane of optimum focus distance defined at the second lens setting, the apparatus further being operative so that the second exposure period occurs during a time in which a lens setting of the lens assembly is transitioning from the second lens setting to the first lens setting with the plane of optimum focus distance "b" being a changing distance intermediate of a plane of optimum focus distance defined at the second lens setting and a plane of optimum focus distance defined at the first lens setting.

9. The apparatus of claim 1, wherein the apparatus is operative so that the first exposure period occurs during a time at which the lens element is being driven with a sinusoidal drive voltage, and further so that the second exposure period occurs during a time at which a drive voltage is in a removed state in relation to the lens element.

10. The indicia reading apparatus of claim 1, wherein the apparatus is further operative so that the first and second frames are exposed responsively to a single operator initiated read attempt of the apparatus.

11. The indicia reading apparatus of claim 1, wherein the lens assembly is configured so that a first transition time between a maximally far focus lens setting and a minimally near focus lens setting is between 40 percent and 160 percent of a duration of a second transition time between the minimally near focus lens setting and maximally far focus lens setting.

12. The indicia reading apparatus of claim 1, wherein the lens assembly is configured so that a first transition time between a maximally far focus lens setting and a minimally near focus lens setting is less than 30 ms.

13. The indicia reading apparatus of claim 1, wherein the apparatus is configured so that the first exposure period and second exposure period occur during a time at which a lens setting of the lens assembly is transitioning between a farther plane of optimum focus lens setting and a nearer plane of optimum focus lens setting, wherein one or more of the plane of optimum focus distances "a" and "b" is a changing distance intermediate of a plane of optimum focus distance defined at the farther plane of optimum focus lens setting and a plane of optimum focus distance defined at the nearer focus plane of optimum focus lens setting, wherein a pixel of the image sensor array has a shielded storage region that stores subsequent to the first exposure period and prior to readout a charge representative of light incident on the pixel during the first exposure period, and wherein the image sensor array is controlled so that the first exposure period comprises a simultaneous exposure initiation time and a simultaneous exposure termination time for a plurality of rows of pixels of the image sensor array.

14. The apparatus of claim 1, wherein the apparatus is further operative to expose during a third exposure period a third frame of image data with the lens assembly defining a plane of optimum focus distance "c" from the apparatus, and wherein the apparatus is operative to discard the third frame of image data responsively to a quality evaluation of the third frame of image data.

15. An apparatus comprising:
an image sensor array having a plurality of pixels, a memory for storing image data, wherein the apparatus is adapted for processing the image data for attempting to decode decodable indicia represented in the image data, a lens assembly for focusing an image of a target onto the image sensor array, the variable lens assembly including a lens element having a first light transmissive substrate and a second light transmissive substrate, the first light transmissive substrate including a first electrode, the second light transmissive substrate including a second electrode, the lens element further having liquid crystal material disposed between the first substrate and the second substrate, the apparatus further being operative to expose during a first exposure period a first frame of image data with the lens assembly defining a plane of optimum focus distance "a" from the apparatus, and wherein the apparatus is further configured so that the apparatus is operative to subject the first frame of image data to a decode attempt for decoding of a decodable indicia, wherein the apparatus is configured so that the first exposure period occurs during a time at which a lens setting of the lens assembly is transitioning between a farther plane of optimum focus lens setting and a nearer plane of optimum focus lens setting, the plane of optimum focus distance "a" being intermediate a plane of optimum focus distance defined at the farther plane of optimum focus lens setting and a plane of optimum focus distance defines at the nearer plane of optimum focus lens setting, wherein a pixel of the image sensor array has a shielded storage region that stores subsequent to the first exposure period and prior to readout a charge representative of light incident on the pixel during the first exposure period, and wherein the image sensor array is controlled so that the first exposure period comprises a simultaneous exposure initiation time and simultaneous termination time for a plurality of rows of pixels of the image sensor array.

16. The apparatus of claim 15, wherein the plane of optimum focus distance "a" is changing distance so that the distance "a" has a first value at a commencement of the first exposure period and a second value at the termination of the first exposure period.

17. A computer program product for establishing a liquid crystal lens assembly lens setting, the computer program product comprising: a computer readable storage medium readable by a processing circuit and storing instructions for execution by the processing circuit for performing a method comprising: obtaining, by a processor, a liquid crystal lens assembly lens setting information from a configuration resource; determining, by the processor, responsively to the lens setting information lens element driving data; transmitting, by the processor, to a liquid crystal lens element driver circuit, the lens element driving data.

* * * * *